(12) United States Patent
Oishi

(10) Patent No.: US 8,885,226 B2
(45) Date of Patent: Nov. 11, 2014

(54) IMAGE FORMING APPARATUS

(71) Applicant: Canon Kabushiki Kaisha, Tokyo (JP)

(72) Inventor: Tetsu Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/932,156

(22) Filed: Jul. 1, 2013

(65) Prior Publication Data

US 2014/0055823 A1 Feb. 27, 2014

(30) Foreign Application Priority Data

Aug. 23, 2012 (JP) ................. 2012-184118

(51) Int. Cl.
*G06K 15/02* (2006.01)
*H04N 1/32* (2006.01)

(52) U.S. Cl.
CPC .......... *G06K 15/1892* (2013.01); *G06K 15/189* (2013.01); *H04N 1/32144* (2013.01); *H04N 2201/327* (2013.01); *H04N 2201/3246* (2013.01); *H04N 2201/0091* (2013.01); *H04N 2201/3271* (2013.01)
USPC .......................................... 358/3.28; 358/1.9

(58) Field of Classification Search
USPC ......... 358/1.9, 3.28, 3.21; 283/100, 102, 113; 713/176
See application file for complete search history.

(56) References Cited

U.S. PATENT DOCUMENTS

| 8,665,480 B2 * | 3/2014 | Wada et al. ................. 358/1.15 |
| 2001/0044899 A1 * | 11/2001 | Levy .............................. 713/176 |
| 2009/0037388 A1 * | 2/2009 | Cooper et al. .................... 707/3 |
| 2010/0086170 A1 * | 4/2010 | Tian et al. ..................... 382/100 |
| 2011/0299723 A1 * | 12/2011 | Ohira ............................ 382/100 |
| 2013/0007462 A1 * | 1/2013 | Petrovic et al. ............... 713/176 |
| 2014/0129841 A1 * | 5/2014 | McMillan ..................... 713/176 |

FOREIGN PATENT DOCUMENTS

| JP | 2003-143391 A | 5/2003 | |
| JP | 2013047882 | * 3/2013 | ............... G06F 3/12 |

* cited by examiner

*Primary Examiner* — Jerome Grant, II
(74) *Attorney, Agent, or Firm* — Fitzpatrick, Cella, Harper & Scinto

(57) ABSTRACT

In a case where the digital watermarking onto the document is implemented once at the time of printing and printed so as to update the printing contents of the document, the contents of the newly printed digital watermark does not match with that of existing digital watermark already printed. The contents of the digital watermark are also updated so to make them in conformity with the printing contents updated. The contents of the digital watermark and the position thereof are read by the scanning operation. In a case where the original digital watermark can be overwritten at the time of on-print processing, the overwriting operation is performed, while, in a case where cannot be overwritten, the printing operation is perform onto the new paper sheet.

4 Claims, 15 Drawing Sheets

FIG.12A

| X-COORDINATE | Y-COORDINATE | Color |
|---|---|---|
| 100 | 100 | Yellow |
| 120 | 110 | Yellow |
| 130 | 140 | Magenta |
| 135 | 150 | Cyan |
| ... | ... | ... |
| | | |

FIG.12B

| X-COORDINATE | Y-COORDINATE | Color |
|---|---|---|
| 100 | 100 | Yellow |
| 120 | 110 | Yellow |
| 125 | 120 | Yellow |
| 130 | 140 | Magenta |
| 130 | 145 | Yellow |
| 135 | 150 | Cyan |
| ... | ... | ... |
| | | |

FIG.12C

| X-COORDINATE | Y-COORDINATE | Color |
|---|---|---|
| 100 | 100 | Yellow |
| 130 | 140 | Magenta |
| 135 | 150 | Cyan Yellow |
| 140 | 100 | Magenta |
| ... | ... | ... |
| | | |

IMAGE FORMING APPARATUS

BACKGROUND OF THE INVENTION

1. Field of the Invention

The present invention relates to an image forming apparatus capable of handling a digital watermark.

2. Description of the Related Art

In order to detect an unauthorized copy or falsified data, the digital watermarking technology has been employed as a technology for embedding information at the time of printing. The information representing a name of an author, charge information, the allowable number of copying operations or the like, can be mainly cited as information to be embedded as the digital watermark.

Japanese Patent Laid-Open No. 2003-143391 sets forth a process for printing the digital watermark, and specifically describes a technology for printing the digital watermark divided into the background pattern and the front pattern.

Generally, the processing for embedding the digital watermark is implemented in a case where print data from the printer driver is printed onto a recording material. Further, it is also implemented in a case where a document image is copied onto a recording material. That is, image data from a document is read out and printed onto a recording material. In this connection, in a case where it is realized to apply a print processing to a document from which image data is read out, a new use case where the digital watermark is printed onto the document which is read out is to be considered. In such a new use case, for example, in a case where a new digital watermark that updates the contents of a digital watermark printed on the document which is read out is printed on the read document, the contents of updated digital watermark, sometimes, does not match with the intended contents.

SUMMARY OF THE INVENTION

An image forming apparatus in accordance with the present invention includes: an obtaining unit configured to obtain first digital watermark information from a document; a determining unit configured to determine whether it is enabled or not that second digital watermark information is written ever the document, wherein the second digital watermark is generated by updating the first digital watermark information; and a printing unit configured to print a digital watermark representing the second digital watermark information onto the document, in a case where the determining unit determines that the writing over is enabled.

According to the present invention, it becomes possible to update contents of the digital watermark included in the already-read document so as to make the contents in conformity with the correction of the printing contents.

Further features of the present invention will become apparent from the following description of exemplary embodiments (with reference to the attached drawings).

BRIEF DESCRIPTION OF THE DRAWINGS

FIG. 12A to FIG. 12C are schematic diagrams showing examples of digital watermarks, in accordance with embodiment 1;

DESCRIPTION OF THE EMBODIMENTS

Figure 1:
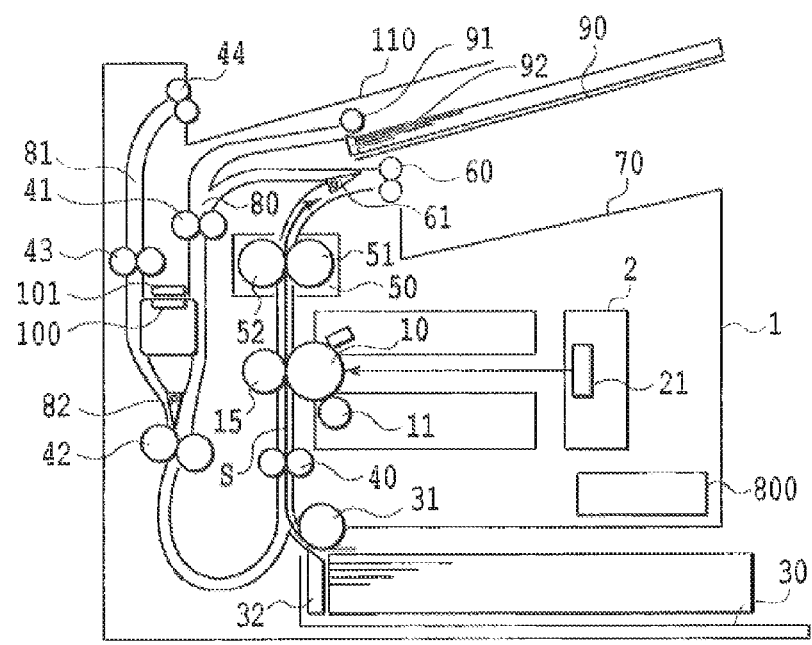
FIG. 1 is a schematic diagram showing a simplified configuration of an image forming apparatus having multi-functions, in accordance with embodiment 1.

Referring to the drawings, various embodiments for implementing the present invention will be detailed in the following.

Embodiment 1

In embodiment 1, an image forming apparatus that reads a document and applies a printing operation onto the document will be detailed in the following. Initially, an image forming process to be performed in the image forming apparatus according to embodiment 1 will be detailed.

FIG. 1 is a schematic diagram showing a simplified configuration of an image forming apparatus having multi-functions. In addition to the printing function, the multi-functions includes, for instance, a copy function, a function for storing data read from a document, a transmitting function thereof, etc. Further, according to the present embodiment, a function for extracting digital watermark information from an already-read (i.e., scanned) document and a function for printing a digital watermark are also included in the multi-functions.

At a center position of an image forming apparatus 1, a photoreceptor drum 10 serving as an image bearing member is disposed in a rotatable manner, and a developing roller 11 that rotates while retaining toner thereon is arranged in parallel with the photoreceptor drum 10. Receiving a printing signal, a light emitting unit 21 provided in an optical unit 2 irradiates, with the laser beam, the surface of the photoreceptor drum 10 currently rotating. An electrostatic latent image is formed on the surface of the photoreceptor drum 10 which has bees irradiated with the laser beam. Then, the developing roller 11, currently rotating and retaining toner thereon, applies toner onto the latent image formed on the circumferential surface of the photoreceptor drum 10, so as to form a toner image on the circumferential surface of the photoreceptor drum 10.

On the other hand, recording mediums S, accommodated in a first paper-sheet feeding unit 30, are sequentially picked up and conveyed one by one to a pair of conveyance rollers 40 by a combined action of a CST pickup roller 31 and a separating unit 32. The pair of conveyance rollers 40 conveys the recording medium 8 to a transfer unit 15 so as to match the timing of both leading edge positions of the toner image on the surface of the photoreceptor drum 10 and the recording medium S.

The toner image, conveyed to the transfer unit 15 by the rotating action of the photoreceptor drum 10, is transferred onto the recording medium S by applying a bias voltage and a pressure to the transfer unit 15. Further, the transfer unit 15 conveys the recording medium S to a fixing unit 50. In the fixing unit 50, a heat roller 51 and a pressure roller 52, which are mounted in a rotatable manner and opposes to each other, respectively apply heat and pressure onto the recording medium S, so as to fix the toner image thereon. Then, the recording medium S bearing the fixed toner image thereon is further conveyed to a pair of ejecting rollers 60.

In a case where a single side printing mode is established, the pair of ejecting rollers 60 conveys the recording medium S outside the image forming apparatus 1 as it is, so as to stack the recording mediums S on a first paper-sheet ejecting unit 70.

Further, the constituents of the image forming apparatus 1 are controlled by an electric device 800, which will be detailed later on by referring to the schematic diagram shown in FIG. 8.

Figure 2:
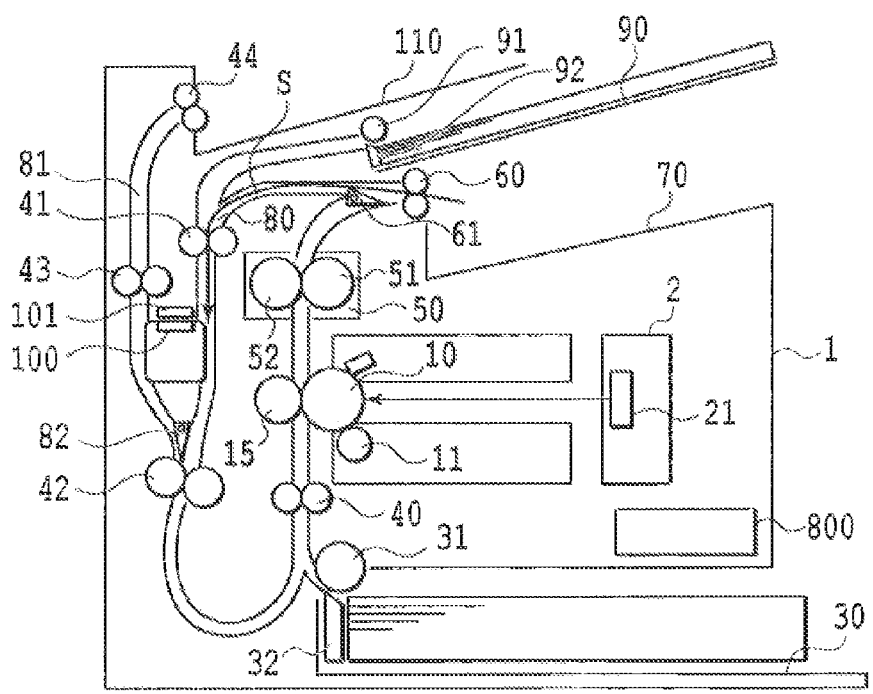
FIG. 2 is an explanatory schematic diagram for explaining a process of a duplex printing mode, in accordance with embodiment 1.

FIG. 2 is an explanatory schematic diagram showing a process of the duplex printing mode. A duplex flapper 61 changes over a conveyance path after the trailing edge of the recording material S has passed therethrough. Then, the pair of ejecting rollers 60 rotates in the reverse direction so as to make the recording material S enter into a duplex conveyance path 80. The recording material S, currently switch-backed, is further conveyed to an image reading unit 100 through a pair of conveyance rollers 41. Successively, the recording material S is conveyed to a pair of conveyance rollers 42 and the pair of conveyance rollers 40, and again to the transfer unit 15, through the transferring and fixing operations, the recording material S is ejected onto the first paper-sheet ejecting unit 70 so as to stack it one by one thereon.

Figure 3:
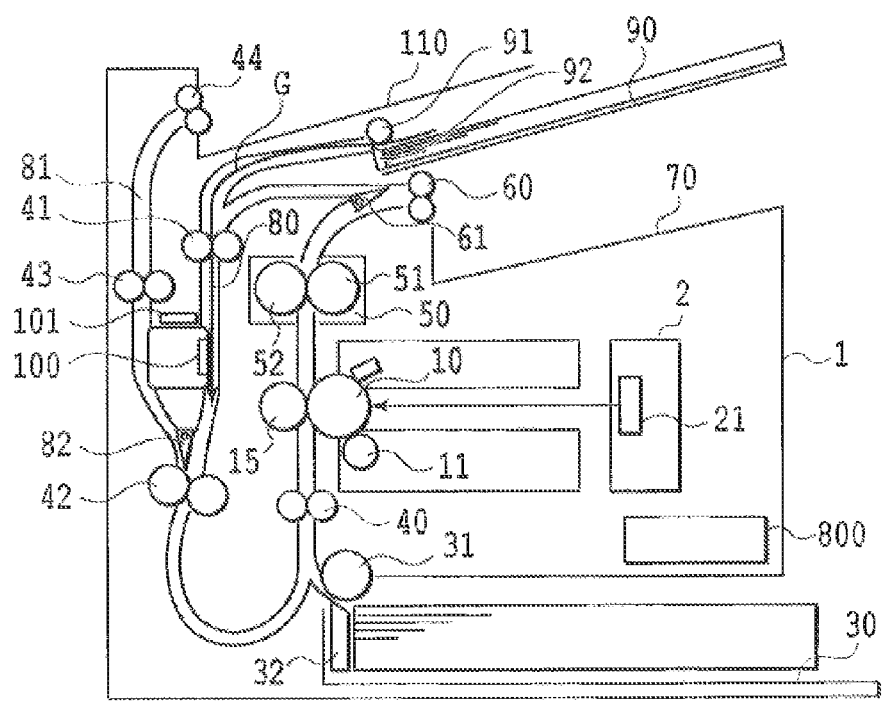
FIG. 3 is an explanatory schematic diagram for explaining a state of a document at the time of starting an operation for reading an obverse surface of the document, in accordance with embodiment 1.

Next, an operation for reading document information and a process for implementing the duplex printing onto the recording material will be detailed. FIG. 3 is an explanatory schematic diagram showing the start time of reading the document obverse surface. Documents G accommodated in a second paper-sheet feeding unit 90 are sequentially conveyed one by one to the pair of conveyance rollers 41 by a CIS pickup roller 91 and a separating unit 92. On the other hand, the image reading unit 100 implements, before the start of reading a first face that is the document obverse surface of the document G fed from the second paper-sheet feeding unit 90, emitting a light to a white reference material 101 and correcting a white reference value, subsequently, rotates to a position opposing to the duplex conveyance path 80. The pair of conveyance rollers 41 conveys the document G to the image reading unit 100. Since the image reading unit 100 is waiting at the standby position opposing to the duplex conveyance path 80, the information read by the image reading unit 100 is stored in image data memory 804, detailed later by referring to the block diagram shown in FIG. 8, as the information of the first face of the document. In this connection, the white reference material 101 is disposed in such a manner that the white reference surface is directed downward, in order to pay attention for avoiding dust adhesions.

Figure 4:
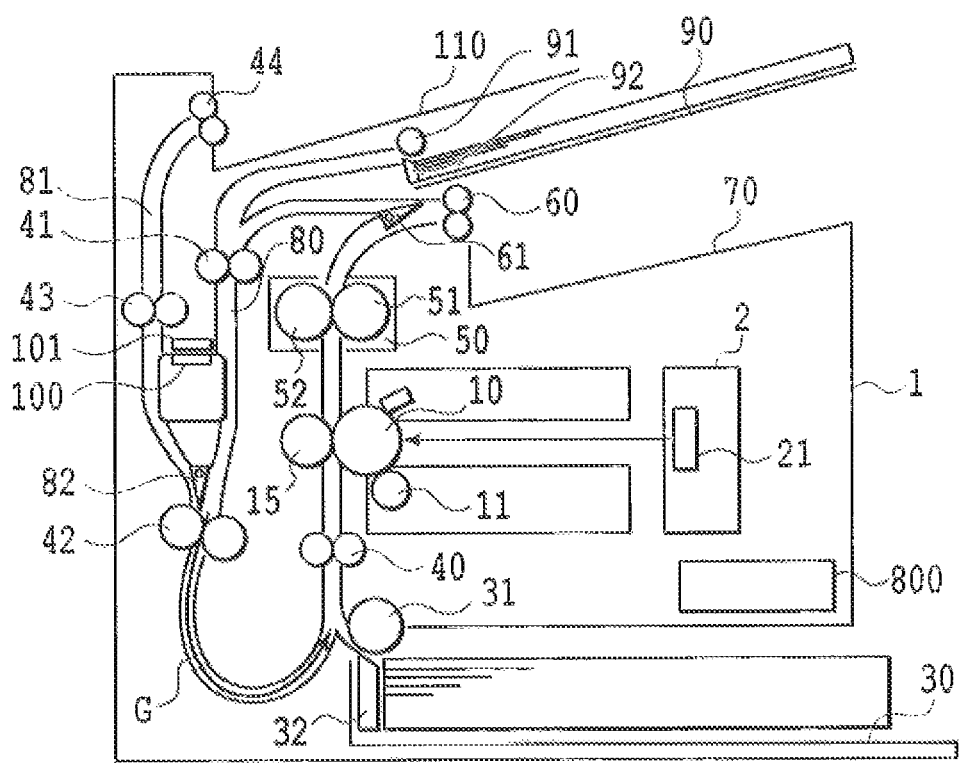
FIG. 4 is an explanatory schematic diagram for explaining a state of a document in the case of finalizing an operation for reading a first face, serving as an obverse surface of the document, in accordance with embodiment 1.

FIG. 4 is an explanatory diagram showing the end time of reading the first face which is the document obverse surface. The document G passed through the image reading unit 100 is conveyed to the pair of conveyance rollers 42. The rotating action of the pair of conveyance rollers 42 is stopped in the case where the trailing edge of the document G has passed through a switch-back flapper 82. Accordingly, the document G is stopped in the state of being tightly clipped by the pair of conveyance rollers 42. After a predetermined time has passed, the document G is conveyed into a document conveyance exclusive path 81.

Figure 5:
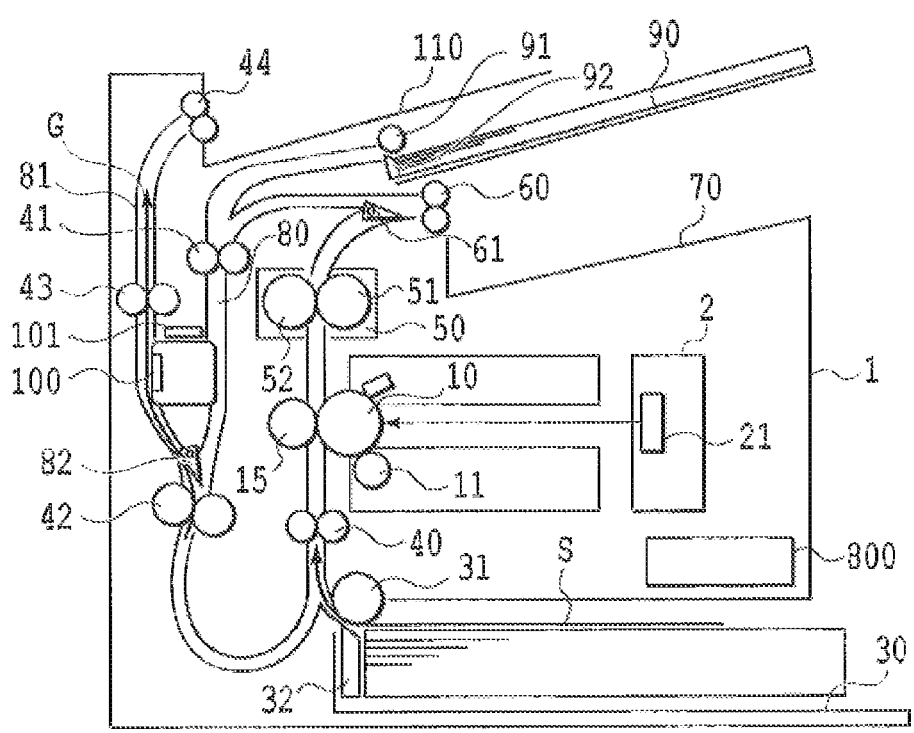
FIG. 5 is an explanatory schematic diagram for explaining a state of a document in the case of starting an operation for reading a second face, serving as a reverse surface of the document, in accordance with embodiment 1.

FIG. 5 is an explanatory diagram showing the start time of reading a second face that is the document reverse surface. After the switch-back flapper 82 changes the conveyance path from the duplex conveyance path 80 to the document conveyance exclusive path 81, the image reading unit 100 rotates to a position opposing to the document conveyance exclusive path 81. Then the pair of conveyance rollers 42 rotates in the reverse direction so as to convey the document G to the image reading unit 100 along the document conveyance exclusive path 81. Since the document G passes through the image reading unit 100, the information of the second face, serving as the reverse surface of the document G, is read thereby and stored into the image data memory 804 as the information of the second face of the document G. The recording materials S fed from a first paper-sheet feeding unit 30 are sequentially conveyed one by one to the pair of conveyance rollers 40. At nearly the same time, based on the information of the second face which is the document reverse face stored in the image data memory 804, the light emitting unit 21 forms a latent image according to the image information for the photoreceptor drum 10. Successively, the transfer unit 15 transfers a toner image, formed from the latent image, onto the recording material S, and then, five recording material S is conveyed to the fixing unit 50, etc., to finalize the operation for forming an image on the second face of the document.

In this connection, although the operation for reading the second face serving as the reverse surface of the document and the feeding action of the recording material S are started at substantially the same time in the schematic diagram shown in FIG. 5, the recording material S may be conveyed after the operation for reading the second face has been completed.

Figure 6:
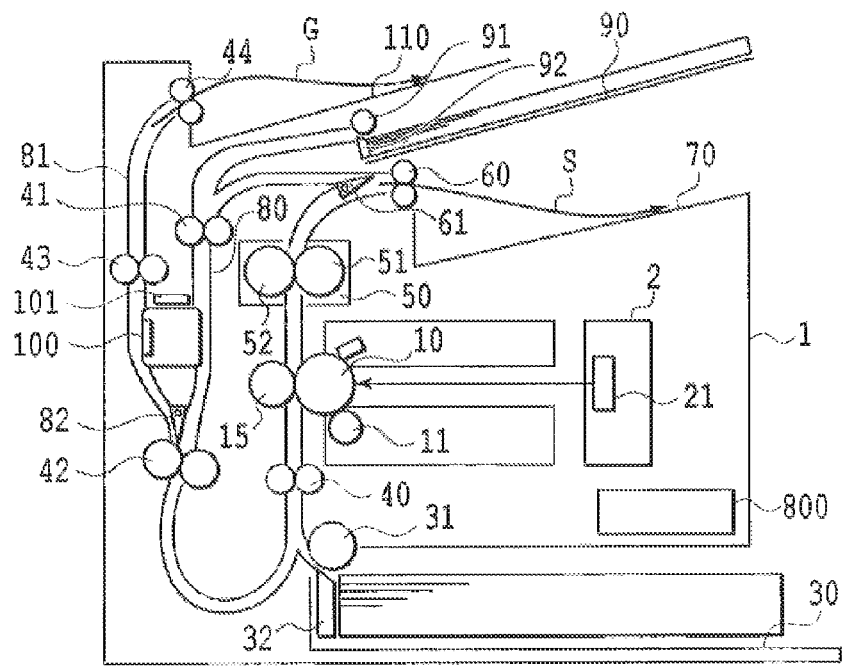
FIG. 6 is an explanatory schematic diagram for explaining a state of a document in the case of finalizing an operation for reading a reverse surface of the document, in accordance with embodiment 1.

FIG. 6 is an explanatory diagram showing the end time of reading the document reverse surface. The document G, for which the image reading operation is completed, is conveyed to a pair of conveyance rollers 43 and a pair of conveyance rollers 44, and stacked on a second paper-sheet ejecting unit 110. The switch-back flapper 82 changes the conveyance path from the document conveyance exclusive path 81 to the duplex conveyance path 80 after the trailing edge of the document G has passed therethrough so that the recording material S is conveyed towards the pair of conveyance rollers 40. The recording material S, for which the image forming operation of the second face of the document is completed, is further conveyed to the duplex conveyance path 80, changed over by the duplex flapper 61, by the reverse rotation of the pair of electing rollers 60.

Figure 7:
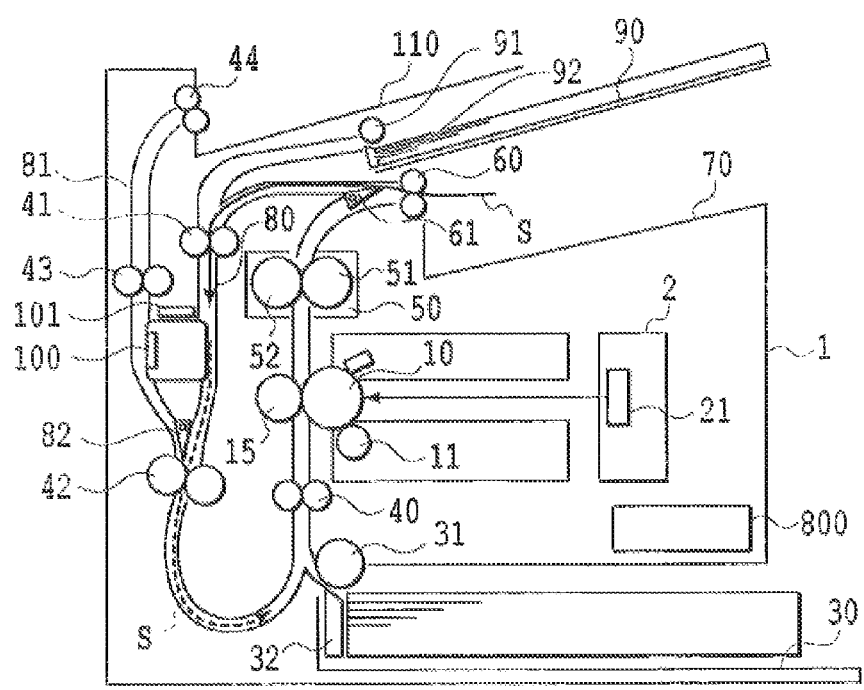
FIG. 7 is an explanatory schematic diagram for explaining a state of a document in the case of finalizing an operation for forming image onto a recording material S, in accordance with embodiment 1.

FIG. 7 is an explanatory diagram showing the completion of image forming for the recording material S. The recording material S conveyed to the duplex conveyance path 80 passes through the image reading unit 100 currently rotated at the reverse position, and then, is conveyed to the pair of conveyance rollers 40 through the pair of conveyance rollers 42. Successively, the recording material S is further conveyed to the transfer unit 15 again, as indicated by the broken lines in the schematic diagram. The image forming for the second face of the document onto the recording material S is already completed. Then, based on the image information of the first face of the document stored in the image data memory 804 in advance, the image forming unit, which is constituted by the optical unit 2, the photoreceptor drum 10, the developing roller 11, the transfer unit 15 and the fixing unit 50, performs transferring and fixing the toner image so as to form an image of the first face or the document. Finally, the recording material S is stacked onto the first paper-sheet ejecting unit 70.

Figure 8:
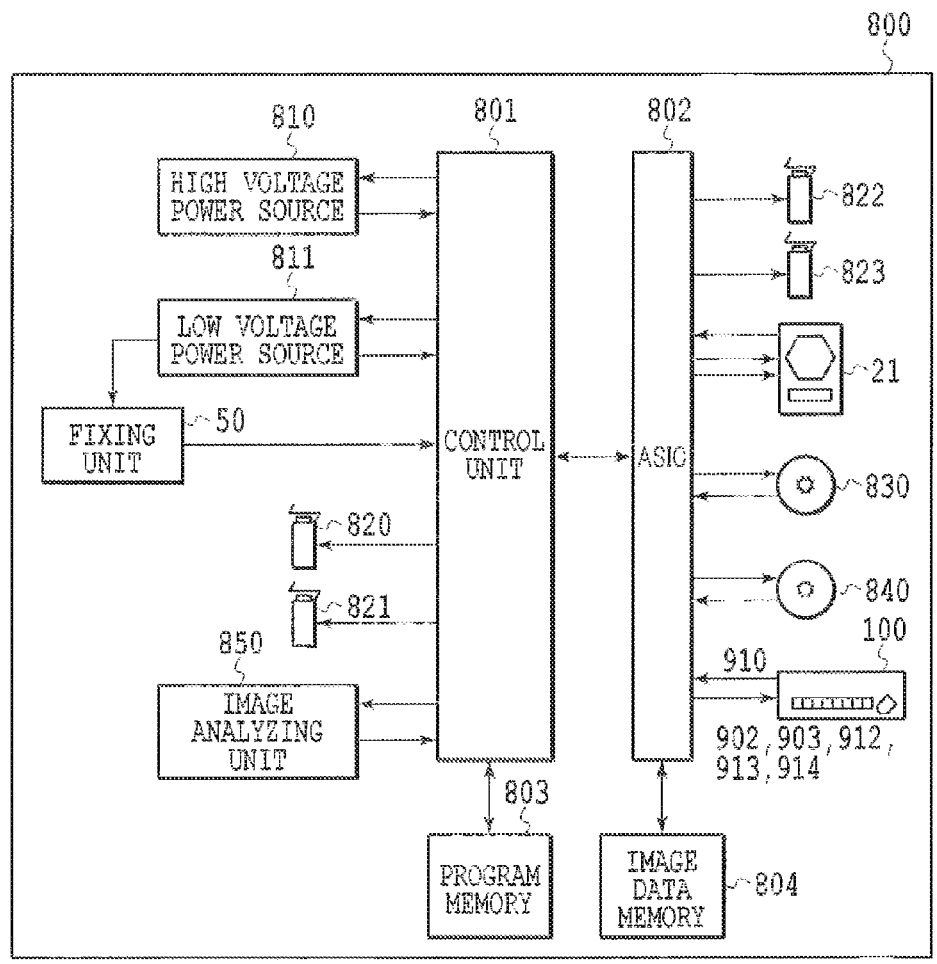
FIG. 8 is a block diagram for explaining an example of operations to be conducted by a control unit, in accordance with embodiment 1.

FIG. 8 is a block diagram showing a system configuration of the electric device 800, centering on a control unit 801 for controlling the image forming apparatus 1.

Referring to the block diagram shown in FIG. 8, with respect to the image forming operation of the image forming apparatus 1, operations to be conducted by the control unit 801 and an ASIC 802 will be detailed. FIG. 8 is the diagram showing the configuration of each of units on which the control unit (CPU) 801 controls. In FIG. 8, the control unit 801 is coupled to a polygon mirror, a motor and the light emitting unit 21 including a laser beam emitting element, etc., through the ASIC 802. Further, in order to depict a desired latent image by scanning a laser beam onto the circumferential surface of the photoreceptor drum 10, the control unit 801 outputs control signals to the ASIC 802 to control the optical unit 2. Similarly, the control unit 801 controls, in order to convey the recording material S, a driving system of a main motor 830 for driving the CST pickup roller 31 and the pair of conveyance rollers 40, the photoreceptor drum 10, the transfer unit 15, a heating roller 51 and a pressure roller 52. Further, the control unit 801 controls a driving system of a CST paper-sheet feeding solenoid 822, which turns on at the start time of driving paper-sheet feeding rollers for feeding the recording material S, for driving the CST pickup roller 31. In addition, the control unit 801 controls driving systems of a duplex driving motor 840, etc. for driving the CIS pickup roller 91 and the pairs of conveyance rollers 41 through 44.

Further, the control unit 801 controls a high voltage power source 810 that further controls a primary charging operation, a developing operation, a primary transferring operation and a secondary transferring operation, which are necessary for the electro-photographic process, and the fixing unit 50 and a low voltage power source 811. Still further, the control unit 801 monitors temperature by employing a thermistor (not shown in the drawings) provided to the fixing unit 50, so as to control for keeping a fixing temperature constant.

Still further, through a bus, etc. which are not shown in the drawings, the control unit 801 is coupled to a program memory 803 in which various kinds of data and programs to be executed for implementing a part of or all of the processing conducted by the control unit 801 in each of the embodiments. In other words, the control unit 801 executes operations in each of the embodiments of the present invention, while employing the programs and the data stored in the program memory 803.

Under the instructions issued by the control unit 801, the ASIC 802 conducts a velocity controlling operation of the motor equipped in the light emitting unit 21, as well as other velocity controlling operations of the main motor 830 and the duplex driving motor 840. The velocity controlling operation of the motor is achieved in such a manner that, based on tack signals (pulse signals to be outputted at intervals corresponding to every revolution of the motor) detected from the motor (not shown in the drawings), an acceleration or deceleration signal is outputted to the motor so as to keep each of the time intervals between the tack signals at a predetermined time interval.

As above-mentioned, the control circuit configured by the hardware circuits of the ASIC 802 may be better to yield such an advantageous merit that the controlling burden incurred to the control unit 801 is alleviated.

Receiving a print command signal sent from a host computer (not shown in the drawings), the control unit 801 drives the main motor 830, the duplex driving motor 840 and a CST paper-sheet feeding solenoid 822 to convey the recording material S.

After the toner image formed on the photoreceptor drum 10 is transferred onto the recording material S by the transfer unit 15, the fixing unit 50 fixes the toner image onto the recording material S, and then, the pair of ejecting rollers 60 ejects the recording material S onto the first paper-sheet ejecting unit 70 serving as a recording material stacking unit. In order to improve the efficiency of truing the image-formed recording materials, a gradually rising slope, which is extended in the paper-sheet ejecting direction from a position in the vicinity of the paper-sheet ejection opening, is formed in the first paper-sheet ejecting unit 70. In this connection, the control unit 801 controls the low voltage power source 811 to supply a predetermined electric power to the fixing unit 50, so that the fixing unit 50 generates a desired amount of heat to be applied to the recording material S, so as to fuse the toner image residing on the recording material and to make the toner image fix thereon.

An image analyzing unit 850 analyzes document image data read from the document to extract digital watermark information therefrom. As for the extraction of the digital watermark information, for instance, it may be possible to extract the digital watermark information from the arrangements of the predetermined color dots. Alternatively, it may be also possible to extract the digital watermark information, by establishing predetermined imaginary grids within the image data, through the inclination angels between the dots in the image data and the imaginary grids. Further, the image analyzing unit 850 detects a position at which the digital watermark is embedded as a part of the digital watermark information, as well. In this connection, any one of the existing methods for extracting the digital watermark may be applicable in the present embodiments. However, since the operation for extracting the digital watermark information is not the main subject of the present embodiments, detailed explanation for them will be omitted hereinafter. In addition to the foregoing, the image analyzing unit 850 determines whether or not the digital watermark information, which is to be printed as an on-print processing, can be written over the already-read document. This determination processing will be detailed later on.

Next, the document reading operation to be conducted in the present embodiment will be detailed.

Receiving a scan command signal sent from a host computer (not shown in the drawings), the control unit 801 drives a duplex flapper solenoid 820, the duplex driving motor 840 and operates a CIS paper-sheet feeding solenoid 823, to make a torque of the duplex driving motor 840 transfer to the CIS pickup roller 91 so as to convey the document G. Further, the image reading unit 100 is coupled to the ASIC 802 via various kinds of control signals including CISLED 903, CISSTART 902, SYSCLK 914, Sl_in 912, Sl_select 913 and Sl_out 910, which will be described later. The control unit 801 stores the image data read from the image reading unit 100 into the image data memory 804 coupled to the ASIC 802, through various kinds of controlling operations via the ASIC 802. After that, the control unit 801 operates a switchback solenoid 821 to turn the switch-back flapper 82 towards the document conveyance exclusive path side, and drives the duplex driving motor 840 in the reverse direction, so as to convey the document G to the second paper-sheet ejecting unit 110.

Figure 9:
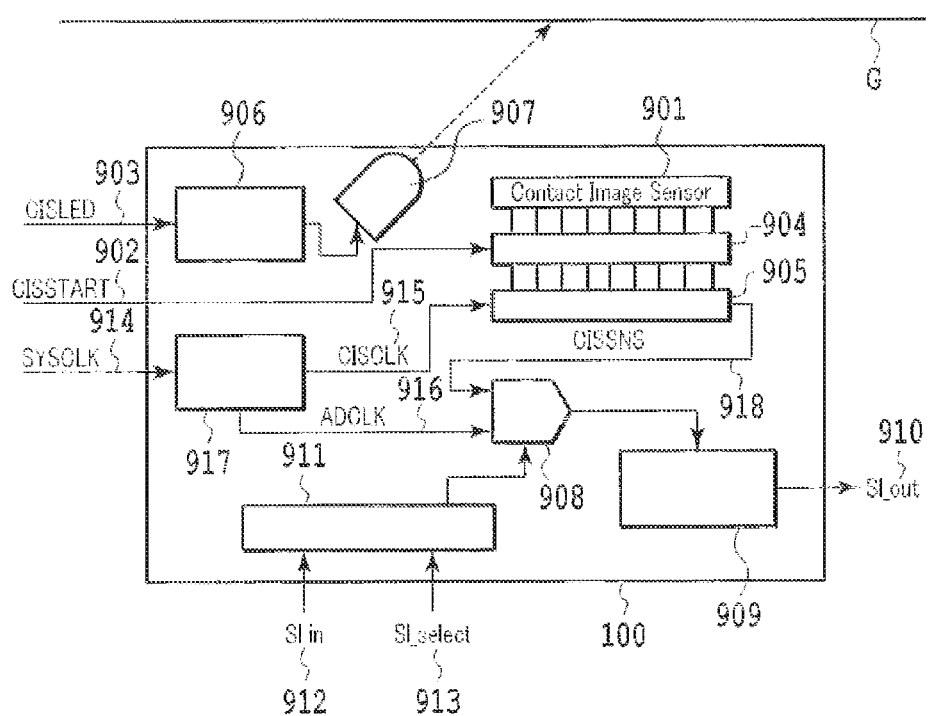
FIG. 9 is a block diagram for explaining an example of configuration of an image reading unit, in accordance with embodiment 1.

Next, referring to FIG. 9, the image reading unit 100 will be described in detail.

The circuit block diagram of the CIS (Contact Image Sensor) is indicated in the drawing concerned.

In the drawing, numeral 901 indicates a contact image sensor unit in which photodiodes corresponding to, for instance, 10368 pixels are arranged in an array pattern with a specific main scanning density (for example, 1200 dpi). Numerals 902 and 915 indicate a signal CISSTART serving as a start pulse and signals CISCLK serving as transfer clock signals to be inputted into the CIS, respectively. Further, numeral 914 indicates signals SYSCLK serving as system clock signals that determine an operating velocity of the CIS unit, numeral 908 indicates an A/D converter. Numeral 916 indicates a CIS sampling clock ADCLK that determines a sampling velocity of the A/D converter 908. Numeral 917 indicates a timing generator. Numeral 904 indicates an output buffer. Numeral 905 indicates a shift register. Numeral 903 indicates a control signal CISLED for a light-emitting element. Numeral 906 indicates a current amplifier. Numeral 907 indicates a light emitting element which uniformly irradiates the document G.

Next, operations will be described.

In a case where the signal CISSTART 902 is turned to an active status, the contact image sensor unit 901 starts accumulating electric charge based on the received light, and sequentially settles data into the output buffer 904. Successively, by inputting the transfer clock CISCLK 915 (for instance, having a frequency substantially in a range of 500 kHz-1 MHz), the data settled in the output buffer 904 is transferred to the A/D converter 908 as a signal CISSNS 918 by the shift register 905. Since a predetermined data guarantee area is established in the signal CISSNS 918, it is necessary to perform a sampling operation after a predetermined time has elapsed from the rising edge of the transfer clock CISCLK 915. Further, the signal CISSNS 918 is outputted in synchronization with both the rising edge and the falling edge of the transfer clock CISCLK 913. Accordingly, the frequency of the CIS sampling clock ADCLK 916 is established at double the frequency of the transfer clock CISCLK 915, and the signal CISSNS 918 is sampled at the rising edge of the CIS sampling clock ADCLK 916. The timing generator 917 divides the system clock SYSCLK 914, so as to generate both the sampling clock ADCLK 916 and the transfer clock CISCLK 915. The phase of the sampling clock ADCLK 916 is delayed by the predetermined data guarantee area, compared to that of the transfer clock CISCLK 915.

The signal CISSNS 918 converted into digital by the A/D converter 908, is controlled at a predetermined timing by the output interface circuit 909, and outputted as a serial data Sl_out 910. On that occasion, with respect to the predetermined number of pixels included in the signal CISSNS 918, an analogue-output reference voltage is outputted from the start pulse CISSTART 902, and accordingly, the predetermined number of pixels cannot be used as effective pixels.

On the other hand, a gain of the analogue-to-digital conversion to be performed by the A/D converter 908 can be variably controlled by employing the signal Sl_in 912 and the signal Sl_select 913, both of which are inputted into a control circuit 911.

For instance, in a case where a desired contrast of a captured image cannot be obtained, the control unit 801 makes the A/D converter 908 increase the gain of the A/D conversion, so as to increase the contrast of the image. Accordingly, it becomes possible to always capture an image with a best contrast.

Although such the system that outputs the single output signal CISSNS 918 including all of the pixels, has been described in the foregoing, if is also applicable that all of the pixels are divided into plural areas in order to achieve a high-speed reading operation, and the analogue-to-digital conversion processing for the plural areas are performed simultaneously in parallel. Further, it is needless to say that the CIS can be replaced by a CMOS sensor, a CCD sensor or the like, though the image reading unit 100 that employs the CIS has been described in the foregoing.

Figure 14:
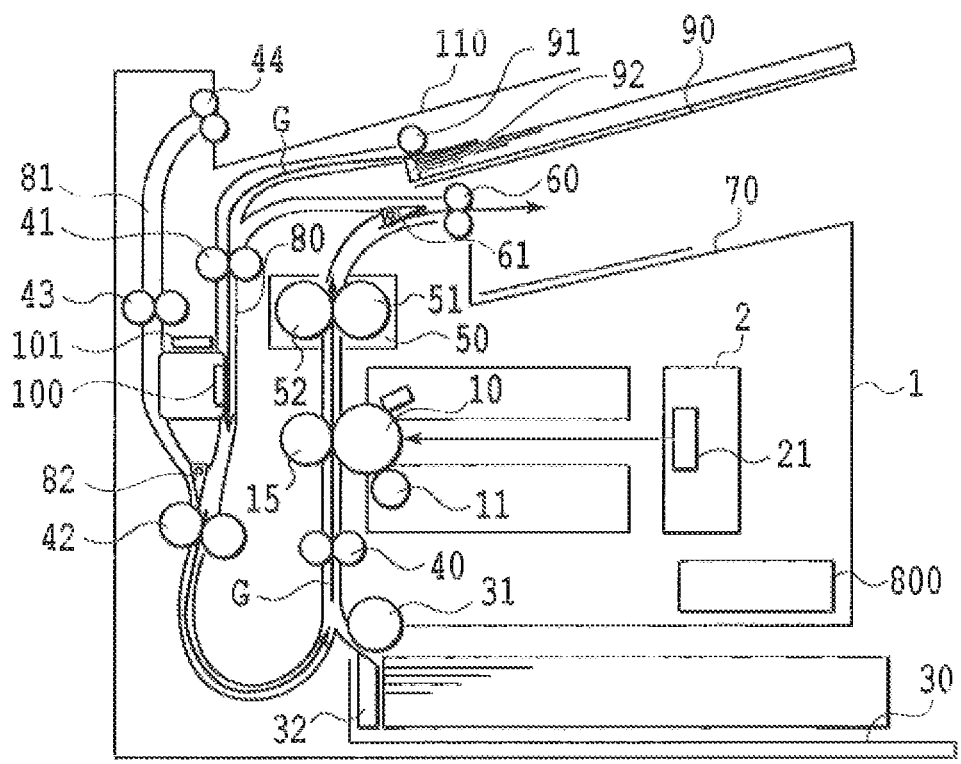
FIG. 14 is an explanatory schematic diagram for explaining an on-print processing, in accordance with embodiment 1.

FIG. 14 is an explanatory schematic diagram for explaining a processing for reading a document, and then, forming an image on the already-read document (hereinafter, referred to as an on-print processing).

Receiving an on-print command and printing contents (image information), both instructed by the host computer (not shown in the drawings), the control unit 801 for controlling the image forming apparatus 1 stores the printing contents into the image data memory 804, and commences the on-print processing. The printing contents include at least one of digital watermark information and other contents desired to be appended to the document (for instance, date information, etc.).

The documents G accommodated in the second paper-sheet feeding unit 90 are sequentially conveyed one by one to the pair of conveyance rollers 41 by the CIS pickup roller 91 and the separating unit 92. On the other hand, the image reading unit 100 implements, before the start of reading the first face which is the document obverse surface of the document G fed from the second paper-sheet feeding unit 90, emitting a light to the white reference material 101 and correcting the white reference value, subsequently, rotates to the position opposing to the duplex conveyance path 80. The pair of conveyance rollers 41 conveys the document G to the image reading unit 100. Since the image reading unit 100 is waiting at the standby position opposing to the duplex conveyance path 80, the information read by the image reading unit 100 is stored in the image data memory 804 shown in FIG. 8 as the information of the first face of the document.

The document G passed through she image reading unit 100 is conveyed to the pair of conveyance rollers 42, and successively, conveyed to the pair of conveyance rollers 40. The pair of conveyance rollers 40 further conveys the document G to a transfer unit 15, so as to match the timing of both leading edge positions of the toner image on the photoreceptor drum 10 and of the document G.

The toner image, conveyed to the transfer unit 15 by the rotating action of the photoreceptor drum 10, is transferred onto the document G by applying a bias voltage and a pressure to the transfer unit 15. Further, the transfer unit 15 conveys the document G to the fixing unit 50. In the fixing unit 50, the heat roller 51 and the pressure roller 52, which are mounted in a rotatable manner and oppose to each other, apply heat and pressure onto the document G, respectively, so as to fix the toner image thereon. Then, the document G bearing the fixed toner image thereon is further conveyed to the pair of ejecting rollers 60.

In the case where the single side printing mode is established, the pair of electing rollers 60 conveys the document G outside the image forming apparatus 1 as it is, so as to stack the document G on the first paper-sheet ejecting unit 70.

As described in the foregoing, the image forming apparatus reads a document and forms an image onto the already-read document. Further, as described in the foregoing, in the present embodiment, the existing reverse conveyance path to be used for duplex printing, which is different from the normal conveyance path for the image forming operation, is commonly employed as the document conveyance path for the document reading unit, and the reading unit is made to be rotatable. Accordingly, it becomes possible to provide a multi-functional image forming apparatus at a low cost, which makes it possible to perform a printing operation even during an operation for reading a document, and to improve the usability thereof.

Figure 10:
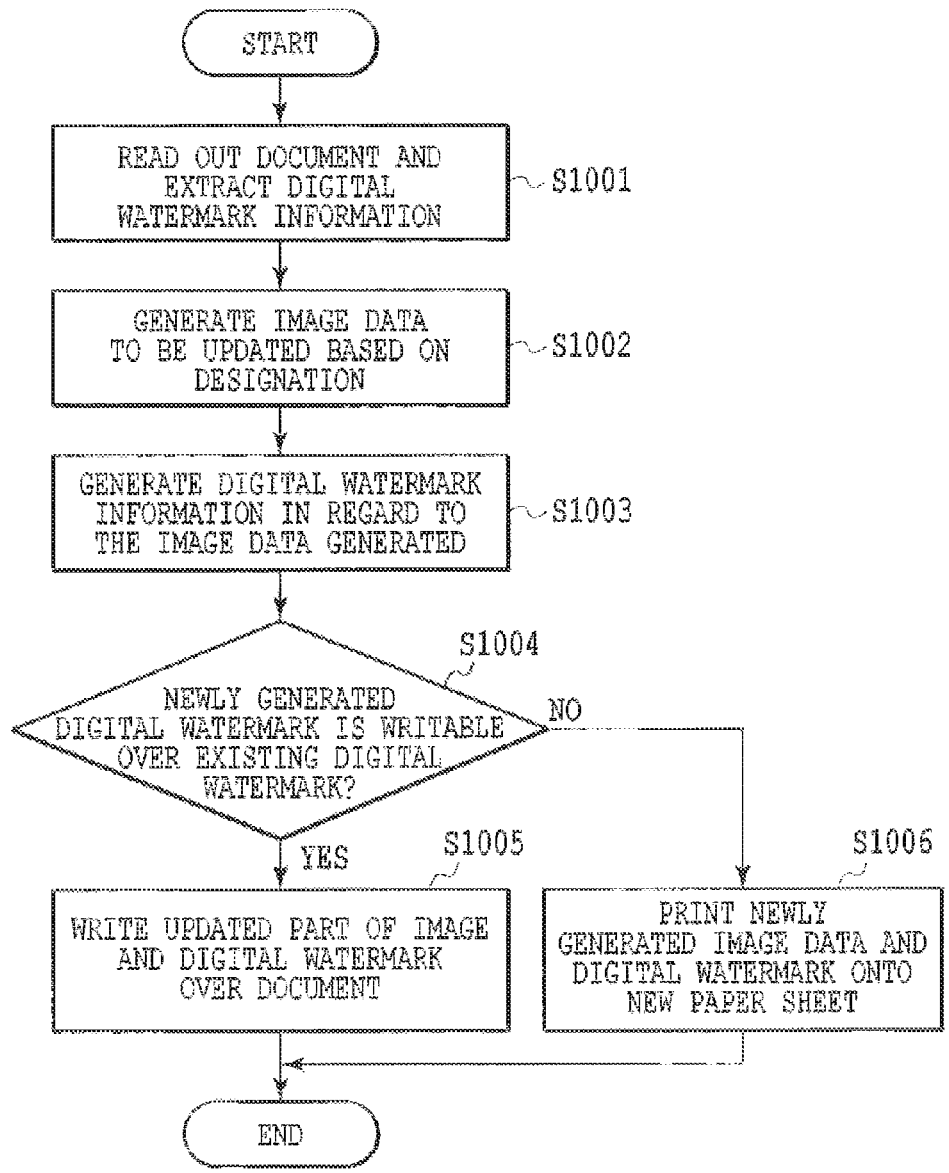
FIG. 10 is a flowchart for explaining an example of operations to be conducted by a control unit, in accordance with embodiment 1.

FIG. 10 is a flowchart showing an on-print processing which includes reading a document, updating printing contents, and printing updated contents onto the same document (processing for printing information onto the already-read document). Referring to the flowchart, operations of the control unit 801 of the image forming apparatus 1 will be detailed.

Receiving an on-print command and printing contents instructed by the host computer (not shown in the drawings), the control unit 801 stores the printing contents into the image data memory 804, and commences the on-print processing. In a case where the on-print command, received from the host computer, designates such an on-print processing that does not include an operation for updating the digital watermark, the control unit 801 prints the printing contents onto the already-read, document as it is. In the following, an updated digital-watermark on-print processing, in which the digital watermark is to be updated, will be detailed.

In Step S1001, the control unit 801 reads out document image data from the already-read document. Then, the control unit 801 extracts digital watermark information (first digital watermark information) from the document image data above-read. The detailed operations are the same as those described referring to the schematic diagram shown in FIG. 14 in the foregoing. Namely, the document G accommodated in the second paper-sheet feeding unit 90 is conveyed to the image reading unit 100, which reads the document G, and the document image data is stored in the image data memory 804. An image analyzing unit 850 analyses the document image data stored in the image data memory 804 to extract and obtain digital watermark information therefrom, and also stores the extracted digital watermark information into the image data memory 804.

Figure 13:
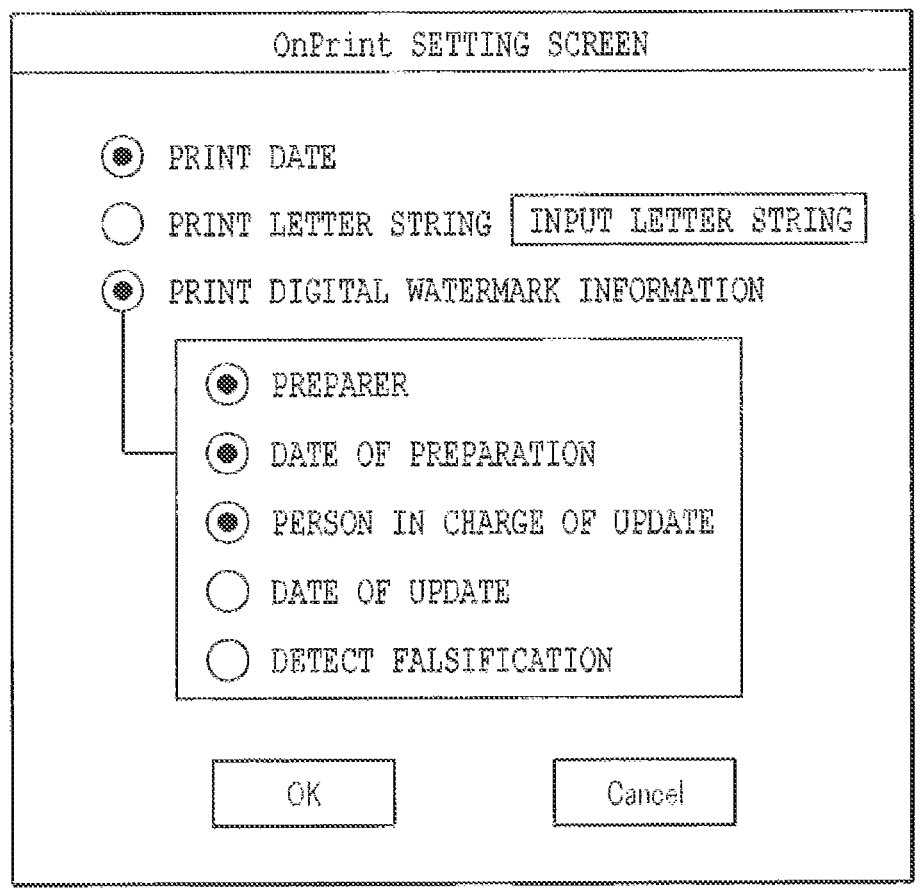
FIG. 13 is a schematic diagram showing a UI screen to designate an on-print processing, in accordance with embodiment 1.

Successively, in Step S1002, the control unit 801 generates image data to be updated, for instance, based on the designations indicated in the schematic diagram shown in FIG. 13. For instance, the contents to be updated include a date printing and an additional printing of a letter string. The printing contents to be updated can be established from the UI screen as shown in FIG. 13. For instance, in a case where the date printing is designated from the UI screen shown in FIG. 13, the control unit 801 generates image data representing a date in which the printing is to be performed. Further, in a case where the implementation of the digital watermark information printing is established from the UI screen shown in FIG. 13, the control unit 801 establishes the digital watermark information in Step S1003 detailed later. Such the UI screen as shown in FIG. 13 is displayed on the host computer. Such the setting information as above-mentioned is included into the on-print command, which is transmitted in the case of instructing the implementation of the on-print printing. In this connection, it is also applicable that such the settings as above-mentioned are established through the operation/display interface or the like provided on the image forming apparatus.

In Step S1003, the control unit 801 generates digital watermark information (second digital watermark information) in regard to the image data generated in Step S1002. For instance, in a case where the date printing is designated in the on-print mode in the UI screen of FIG. 13, and further, an operation for embedding a name of preparer, a creation date and a name of person in charge of updating operation is designated as the digital watermark information, the control unit 801 creates the digital watermark information in regard to them. For instance, in a case where the name of preparer and the creation date are already embedded into the digital watermark information extracted in Step S1001, digital watermark information in regard to the name of update person is newly created in step 1003. Further, in a case where information of the update person (for instance, information of update person A) is included in the digital watermark information extracted in Step S1001, new digital watermark information, in which the information of update person A is rewritten with information of a new update person (for instance, information of update person B), may be generated.

In Step S1004, tore image analyzing unit 850 determines whether or not the digital watermark, newly created in Step S1003, is writable over the existing digital watermark. In other words, the image analyzing unit 850 determines whether it is possible or impossible to write the digital watermark, which represents the digital watermark information created in Step S1003, over the document image data read in Step S1001. In a case where determining that it is possible, the image analyzing unit 850 makes the on-print processing proceed to Step S1005, while, in another case where determining that it is impossible, proceed to Step S1006.

In this connection, as shown in FIG. 12A, a list of dots, each of which is constituted by coordinate values and a color, can be cited as an example of the digital watermark representing the digital watermark information. As shown in FIG. 12B, in a case where the updated digital watermark information includes only additions without updating and/or deleting any one of the element values included in the original information table, the image analyzing unit 850 determines the case as over-writable. On the other hand, as shown in FIG. 12C, in a case where at least one of the element values included in the original information table is updated and/or deleted in the updated digital watermark information, the image analyzing unit 850 determines the case as non-over-writable. In other words, in a case where the digital watermark, which represents the digital watermark information generated in Step S1003, is written over the image data read in Step S1001 (the image data includes the existing digital watermark), no influence is exerted onto the existing digital watermark, the image analyzing unit 850 determines the case as over-writable. For instance, in a case where the digital watermark information extracted in Step S1001 includes the information of update person A, while, the digital watermark information created in Step S1003 includes the information of update person B, the information of update person A should be deleted or changed. Accordingly, in Step S1004, the image analyzing unit 850 determines the above case as non-over-writable.

In Step S1005, the control unit 801 conducts the additional printing operation based on the image data created in Step S1002 and the overwrite processing of the digital watermark, on the already-read document G that is conveyed. In other words, the control unit 801 implements the processing for printing an image based on the image data created in Step S1002 and the digital watermark representing the digital watermark information generated in Step S1003. The document G, read by the image reading unit 100 in Step S1001, passes through the duplex conveyance path 80 shown in FIG. 14, and further is conveyed to the pair of conveyance rollers 40 as it is, by the pair of conveyance rollers 42. The pair of conveyance rollers 40 conveys the document G to a transfer unit 15 so as to match the timing of both leading edge positions of the toner image (image to be updated) on the photoreceptor drum 10 and the document G.

The toner image, conveyed to the transfer unit 15 by the rotating action of the photoreceptor drum 10, is transferred onto the document G by applying a bias voltage and a pressure to the transfer unit 15. Further, the transfer unit 15 conveys the document G to the fixing unit 50. In the fixing unit 50, the heat roller 51 and the pressure roller 52, which are mounted in a rotatable manner and oppose to each other, apply heat and pressure onto the document G, respectively, so as to fix the toner image thereon. Then, the document G bearing the fixed toner image thereon is further conveyed to a pair of ejecting rollers 60.

In a case where the single side printing mode is established, the pair of ejecting rollers 60 conveys the document G outside the image forming apparatus as it is, so as to stack the document G on the first paper-sheet ejecting unit 70.

On the other hand, in Step S1006, the control unit 801 conducts a processing for printing the generated image data and the digital watermark onto a new paper sheet. In other words, the control unit 801 combines the document image data read in Step S1001, the image data created in Step S1002 and the other image data representing the digital watermark information created in Step S1003. Then, the control unit 801 conducts the processing for printing the combined image data which is obtained by combining onto a new recording material. In this case, attention should be given to such a point that, for instance, according to the aforementioned example, the digital watermark representing the digital watermark information, in which the information of update person A is deleted and the information of update person B is added, is to be printed.

As described in the foregoing, according to present embodiment, since the conveyance path which makes it possible to print an image onto the already-read document is provided, it is possible to perform an overwrite operation under the condition that the contents of the digital watermark and the embedded position thereof are read and the original digital watermark can be overwritten in the case of on-print processing. Alternatively, in a case where the digital watermark cannot be overwritten, it is possible to print the image on a new paper sheet. In a case where the digital watermark cannot be overwritten, by printing both the updated printing contents and the digital watermark onto a new paper sheet, it is possible to maintain a consistency between the printing contents and the digital watermark. As described in the above, it becomes possible to provide such a multi-functional image forming apparatus that can also update contents of a digital watermark in conformity with updated printing contents.

Further, in the present embodiment, invisible dot information is described as an example of the digital watermark; however, visible information such as a barcode can be used for the same processing.

Still further, as mentioned above, such the example that, in the case where the command received from the host computer instructs the on-print processing without updating the digital watermark, the digital watermark is printed onto the already-read document as it is. Even in the case of the on-print processing without updating the digital watermark, further in a case where the digital watermark is embedded into the document image data read from the document, it is preferable that the new digital watermark is printed on an area which does not exerts any influence to the existing digital watermark. Further, in a case where the image analyzing unit 850 determines that a position, at which date information or the like is normally to be on-printed, is designated by the user, and the digital watermark information is embedded at the same position, it is possible to conduct the same processing as those in Step S1004 through Step S1006. Namely, in a state where the determination is impossible to apply the overwrite processing onto the document including the digital watermark information, the image data representing a created date, a letter string, etc., the document image data read from the document and the image data representing the digital watermark information are combined, and the combined image data is printed onto the new paper sheet. In this case, it is possible to embed the digital watermark information at a position being different from that of the already-read document.

Embodiment 2

Figure 11:
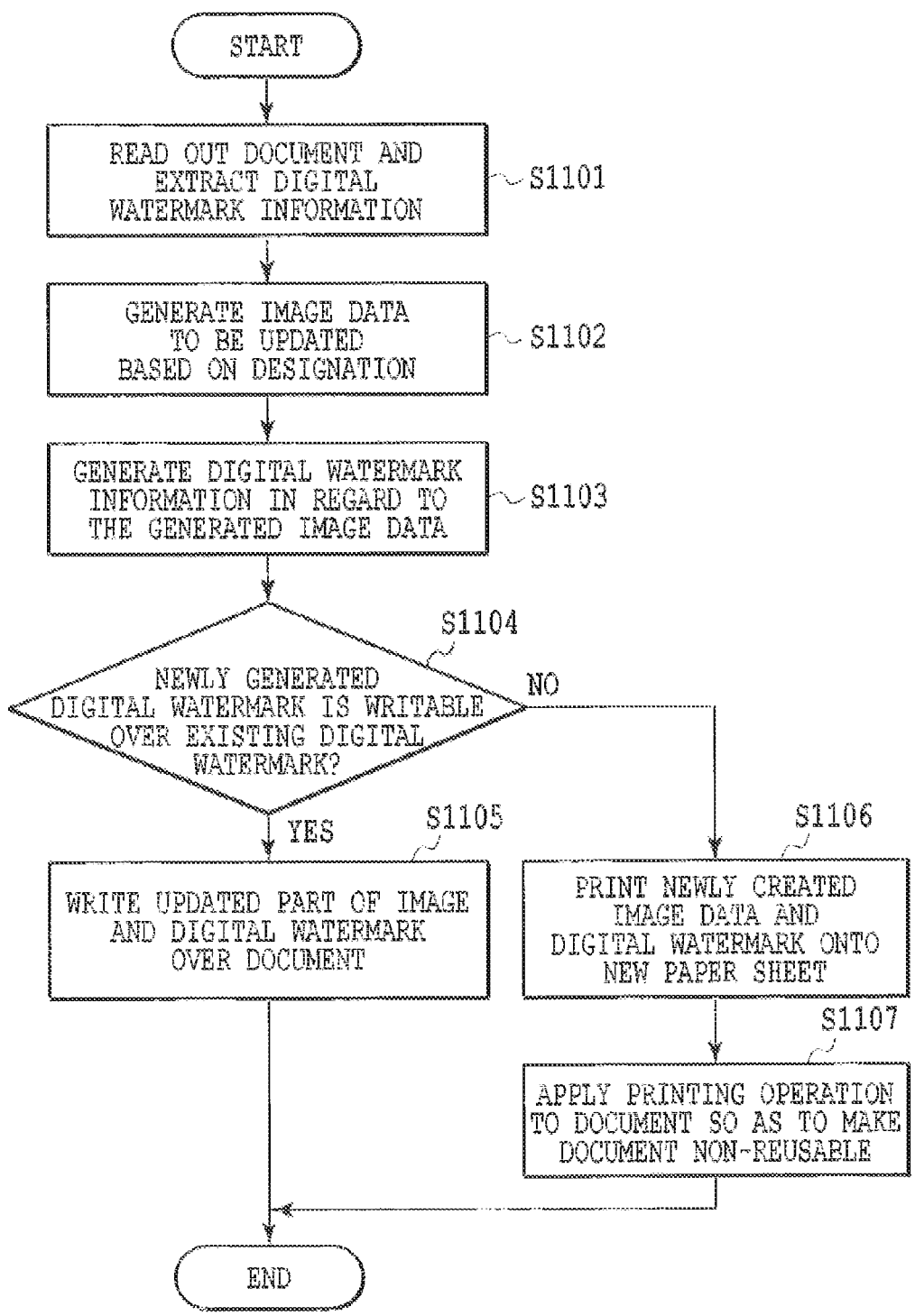
FIG. 11 is a flowchart for explaining an example of operations to be conducted by a control unit, in accordance with embodiment 2.

FIG. 11 is a flowchart showing an on-print processing serving as embodiment 2, which includes reading a document; updating printing contents; and printing updated contents onto the same document. Referring to the flowchart, operations of the control unit 801 of the image forming apparatus 1 will be detailed.

Since the operations in Steps S1101 through S1106 are the same as those in Steps S1001 through S1006 included in the flowchart of embodiment 1, explanations of them are omitted. In Step S1107, after determining that it is impossible to apply the overwrite processing of digital watermark information in Step S1104, and printing the image based on the generated image data and the digital watermark onto a new paper sheet in Step S1106, the control unit 801 prints a marking such as cross marks, or copy-forgery-inhibited pattern, etc. representing a non-reusable status, so as to make the document non-reusable.

As described in the above, according to the present embodiment, in addition to the advantageous effects of the embodiment 1, it becomes possible to print a marking or the like, which make the document non-reusable, onto the document, so as to prevent the document from being erroneously reused.

In this connection, with respect to a document whose original master should be guaranteed, such as valuable securities, etc. it may be possible to make such a determination that a new paper sheet is not outputted and a marking, such as cross marks, etc., should not be printed onto the document.

Embodiment 3

Although such the example that the on-print processing is commenced on the basis of the on-print command for updating the digital watermark, which is instructed by the host computer (not shown in the drawings), is described as the embodiment 1, it is also applicable that the on-print processing is implemented only on the basis of the determination made within the device controller without receiving any instruction from the host computer.

Figure 15:
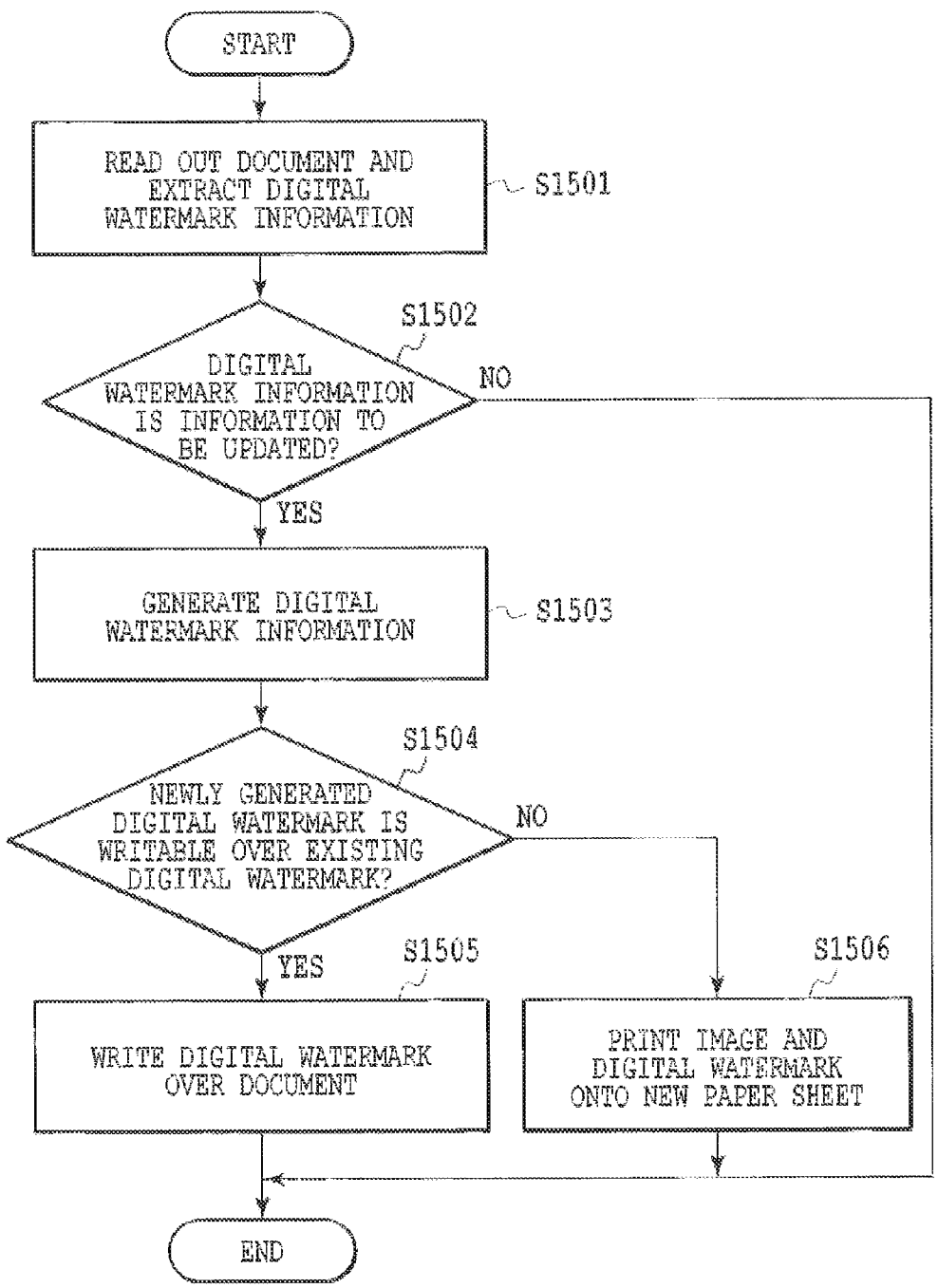
FIG. 15 is a flowchart for explaining an example of operations to be conducted by a control unit, in accordance with embodiment 3.

FIG. 15 is a flowchart showing an on-print processing, which includes reading a document; updating printing contents; and printing updated contents onto the same document. Referring to the flowchart, operations of the control unit 801 of the image forming apparatus 1 will be detailed.

In Step S1501, the control unit 801 reads out document image data from the document, and then, extracts digital watermark information. The detailed operations are the same as those described referring to FIG. 14. The document G accommodated in the second paper-sheet feeding unit 90 is conveyed to the image reading unit 100, which reads the document G, and the document image data is stored in the image data memory 804. Further, the image analyzing unit 850 analyzes the document image data stored in the image data memory 804, and stores the extracted digital watermark information into the image data memory 804.

Successively, in Step S1502, the image analyzing unit 850 determines whether or not the digital watermark information extracted in Step S1501 is such digital watermark information that is to be updated. For instance, in a case where the extracted digital watermark information is such digital watermark information that requests to add a name of a person in charge of updating data, the image analyzing unit 850 determines that the concerned digital watermark information is to be updated. Alternatively, in a case where a name of an original data preparer is stored, or the digital watermark information represents a prohibition of printing and/or copying operations, etc., the image analyzing unit 850 determines that the concerned digital watermark information is not to be updated.

In a case where determining that the digital watermark information is to be updated, the digital watermark information is created in Step S1503. Since the following operations in Steps S1504 through S1506 are the same as the processing in regard to the digital watermark information described in Steps S1004 through S1006 included in the flowchart of embodiment 1, explanations of them are omitted.

In a case where determining that the digital watermark information is not to be updated, the control unit 801 finalizes the processing without updating the digital watermark.

Further, in Step S1502, it is also possible for the image analyzing unit 850 to determine whether or not the document is such a document whose original master should be guaranteed, such as valuable securities, etc. based on the document image data read in Steps S1501. In a case where the document should be guaranteed, the operation for updating the digital watermark information is not implemented.

Still further, even in a case where the on-print command for updating the digital watermark is sent from the host computer (not shown), in a case where it is determined that the digital watermark information is not to be updated in step S1502, this determination of step S1502 can have a priority.

Other Embodiments

In the each of the aforementioned embodiments, such the example, in which the existing reverse conveyance path to be used for duplex printing, which is different from the normal conveyance path for the image forming operation, is commonly employed as the document conveyance path for the document reading unit, and the reading unit is made to be rotatable, has been described in the foregoing. However, the scope of the present invention is not limited to the aforementioned embodiments. In other words, the present invention can be applied to any kind of apparatus, as far as the concerned apparatus is capable of performing an on-print processing for printing an image onto an already-read document.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184118, filed Aug. 23, 2012, which is hereby incorporated by reference herein in its entirety.

What is claimed is:

1. An image forming apparatus, comprising:
an obtaining unit configured to obtain first digital watermark information from a document;
a determining unit configured to determine whether it is enabled or not that second digital watermark information is written over the document, wherein, the second digital watermark is generated by updating the first digital watermark information; and
a printing unit configured to print combined image data on a recording material, wherein the combined image data is generated by combining document image data read from the document with a digital watermark representing the second digital watermark information, in a case where the determining unit determines that the writing over is disabled,
wherein, in the case where the determining unit determines that the writing over is disabled, the printing unit further prints image data onto the document so as to make the document unusable.

2. An image forming apparatus comprising:
an obtaining unit configured to obtain first digital watermark information from a document;
a determining unit configured to determine whether it is enabled or not that second digital watermark information is written over the document, wherein the second digital watermark is generated by updating the first digital watermark information; and
a printing unit configured to print a digital watermark representing the second digital watermark information onto the document, in a case where the determining unit determines that the writing over is enabled,
wherein, in a case where the determining unit determines that the first digital watermark information requests a generation of the second digital watermark information updated from the first digital watermark information, the determining unit performs the determining operation.

3. An image forming method comprising the steps of:
obtaining first digital watermark information from a document;
determining whether it is enabled or not that second digital watermark information is written over the document, wherein the second digital watermark is generated by updating the first digital watermark information; and
printing a digital watermark representing the second digital watermark information onto the document, in a case where the writing over is determined to be enabled in the determining step, wherein, in a case where it is determined that the first digital watermark information requests a generation of the second digital watermark information updated from the first digital watermark information, the determining step performs the determining operation.

4. A non-transitory computer readable storage medium storing a program which causes a computer to perform the image forming method according to claim 3.

* * * * *